April 26, 1927.
G. S. RINEBOLT, SR
1,626,357
FISHLINE REEL
Filed April 3, 1926
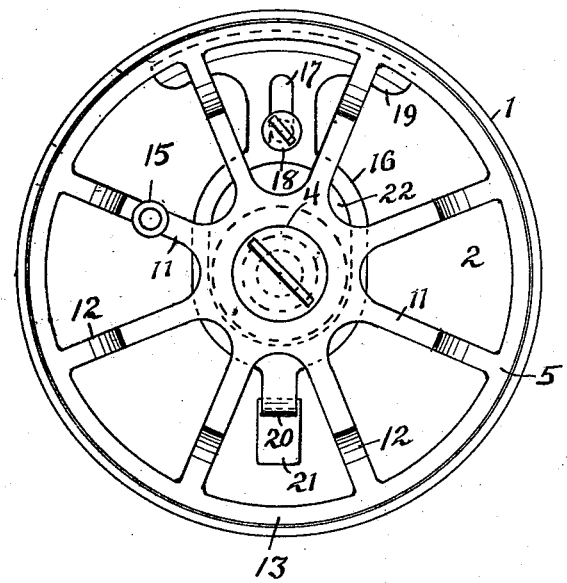
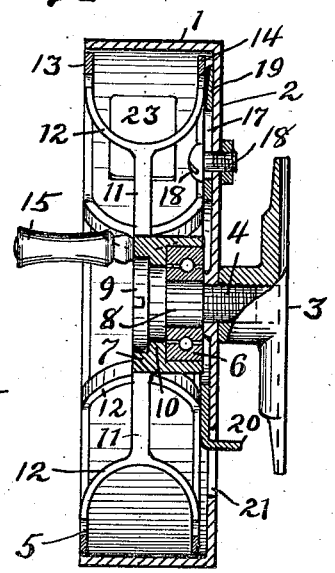
Guy S. Rinebolt Sr INVENTOR
BY
A. G. Burns ATTORNEY Patented Apr. 26, 1927.

1,626,357

UNITED STATES PATENT OFFICE.

GUY S. RINEBOLT, SR., OF HUNTINGTON, INDIANA.

FISHLINE REEL.

Application filed April 3, 1926. Serial No. 99,526.

This invention relates to improvements in fishline reels, and the object thereof is to provide a reel for fishlines, attachable to a pole and so constructed as to obviate entangling of the fishline by "racing" or "over running" of the reel. Another object of the invention is to provide a reel of its class with an automatic braking means to check movement of the reel, which braking means is governable according to the position in which the reel is placed by the operator in manipulating the pole.

These objects are accomplished by the construction illustrated in the accompanying drawings, in which:

Fig. 1 is a front end elevation of a construction embodying the invention; and

Fig. 2 is a side elevation projected from Fig. 1 shown partially in central section.

The characters appearing in the description refer to parts shown in the drawings and designated thereon by corresponding characters.

The invention comprises a cylindrical housing 1 that is closed at one end by a flat head 2, the opposite end of the housing being entirely open. The housing is mounted in connection with a base 3, by means of a screw 4 that extends through the head 2 into the base to hold the housing firmly upon the base.

Positioned within the housing is a reel 5 which is rotatably mounted upon the screw 4, there being a ball bearing 6 located in the inner end of the hub 7 of the reel, which bearing is mounted upon the shank 8 of the screw 4. The head 9 of said screw fits loosely in the outer end of the hub 7 and engages a shoulder 10 therein by which the hub is retained in its proper position upon its bearing. The reel has divergent spokes 11, the outer ends of which are bifurcated so as to present spaced arms 12. The outer ends of said arms are integral with corresponding annular guards 13—14 that are spaced apart and form the respective outer end perimeters of the reel. The reel is provided with an operating handle 15 that is mounted on one of the spokes 11 by which rotary movement is applied to the reel.

Upon the inner face of the head 2 is positioned a sliding plate 16 having therein an elongated slot 17 through which a screw 18 loosely extends, the screw being secured in the head 2. The plate 16 has a head 19 at one end formed in the shape of an arc, the outermost marginal portion of which is tapered and extends between the innermost annular guard 14 and the adjacent face of the head 2 and becomes wedged between the guard and head when the plate is moved radially outward. In this manner rotation of the reel is frictionally resisted. The end of the plate 16 opposite the head is bent to form a thumb piece 20 which projects through an elongated opening 21 in the head, where it is accessible for manipulation. The plate 16 has also an elongated opening 22 in its middle portion for the accommodation of the inner end of the hub 7, said opening being elongated so as to admit of sufficient movement of the plate for its head to engage the guard 14 on the reel.

In utilizing the invention the base 3 is secured upon a fish pole handle (not shown) in the usual manner, and a fishline (not shown) is strung through an opening 23 in the housing and attached to one of the spokes of the reel so that when the reel is revolved the fishline will be wound into a coil extending in the forked outer ends of the spokes. When the fishpole is held so that the reel is positioned with the head of the sliding plate up, the said plate slides downwardly out of contact with the guard 14 on the reel, leaving the reel free to turn upon its axis. Thus, as when casting a bait attached to the line in the usual way, the fishline is withdrawn freely from the reel as the latter revolves. Rotation of the reel may be checked, or stopped altogether, by merely manipulating the fishpole so that the position of the reel is inverted, or the head of the plate is down, in which event the plate drops by gravitation so that its head bears against the guard 14 and thus arrests rotation of the reel. The plate may also be moved into and out of engagement with the reel by manipulating the thumb piece 20 to cause engagement or disengagement of the plate with said guard.

A feature of the invention is the arrangement of the spaced guards on the arms of the bifurcated spokes, and closely encompassed by the cylindrical wall of the housing. This arrangement insures the proper winding of the fishline in the forks of the reel without becoming fouled or entangled in the spokes or between the reel and housing.

What I claim is:—

1. A fishline reel comprising a cylindrical housing having a head at one end and being entirely open at the opposite end; a base; a screw extending through the head of the housing into said base; a bearing within the housing supported on said screw; a reel rotatably mounted on said bearing, said reel having forked spokes and a pair of spaced annular guards integral respectively with the corresponding arms of said forked spokes and forming the respective end perimeters of said reel; a plate on the inner face of the head of said housing having limited sliding movement thereon, the top of said plate being shaped in the form of an arc with a tapering marginal edge, which edge has frictional engagement with the corresponding guard on said reel, one end of said plate being bent and extended through said head to form a thumb-piece, there being an elongated opening in said head admitting of movement of said thumb-piece therein; and an operating handle in connection with said reel, the cylindrical wall of said housing having a guide opening therein for the fishline.

2. A fishline reel comprising a cylindrical housing having a guide opening therein and a head at one end thereof, the opposite end being entirely open; a supporting base for the housing; a bearing in said housing; a reel rotatably mounted on said bearing and sheltered by said housing, said reel having forked spokes and a pair of spaced annular guards attached respectively to the corresponding arms of said forked spokes; and a brake member having guided movement in the housing and operable to frictionally engage one of said guards on the reel when the housing is bodily moved into a certain position.

3. A fishline reel comprising a cylindrical housing having a guide opening therein and a head at one end thereof, the opposite end of the housing being entirely open; a reel rotatably mounted in and sheltered by said housing, one end of the reel being exposed through said open end, said reel having forked spokes and a pair of spaced annular guards attached respectively to the corresponding arms of said forked spokes; and a guided movable brake member having a wedge portion acting between said head and the adjacent guard operable to restrain rotation of said reel when said member is moved into operating position.

4. A fishline reel comprising a cylindrical housing having a guide opening therein and a head at one end thereof; a reel rotatably mounted in and sheltered by said housing; and a guided movable brake member in said housing, having a wedging action between said head and reel when said member is moved into operating position.

5. In a fishline reel including a housing and a reel sheltered thereby, a braking member in the housing having a wedging action between said housing and reel and being movable into operating position by force of gravitation when the housing is moved to a certain position.

In testimony whereof I affix my signature.

GUY S. RINEBOLT, Sr.